May 30, 1933.	S. E. EVANS	1,911,819
CROSS T
Filed March 13, 1930
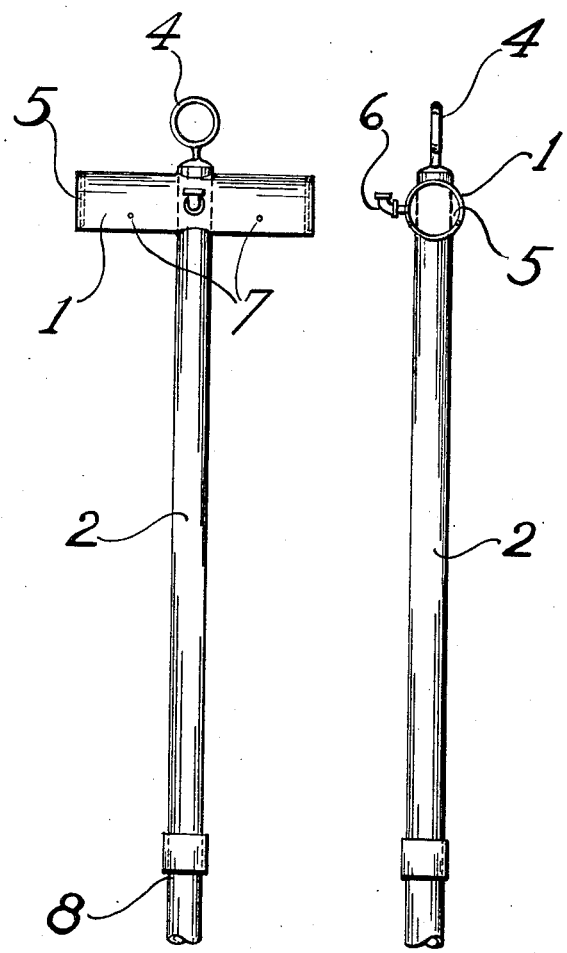
INVENTOR.
Silas E. Evans
BY
W. E. Currie
ATTORNEY.

Patented May 30, 1933

1,911,819

UNITED STATES PATENT OFFICE

SILAS E. EVANS, OF BRISTOW, OKLAHOMA, ASSIGNOR TO STANDARD OIL DEVELOPMENT COMPANY, A CORPORATION OF DELAWARE

CROSS T

Application filed March 13, 1930. Serial No. 435,442.

This invention relates to improvements in cross T's of the type employed on polish rods, sucker rods and the like in deep well operations. The invention will be fully understood from the following description taken in connection with the accompanying drawing in which Fig. 1 is a front elevation of a cross T; and
Fig. 2 is a side elevation of the cross T.

In the drawing, reference numeral 1 designates a tubular cross member and 2 designates a tubular shank of lesser diameter than the cross member. The tubular shank extends through the cross member at substantially the middle portion of the cross member and it is welded or otherwise permanently secured to the cross member. The top end of the shank protruding through the cross member is closed and a lifting-eye 4 is welded or otherwise permanently secured to the closed end of the shank. The ends of the cross member 1 are closed by means of plates 5 welded, or otherwise permanently secured thereto. An L 6 protrudes from the side of the cross member adjacent its middle portion and communicates with the interior of the cross member to admit lubricant. Suitable openings designated 7 are provided in the cross member intermediate its ends which permit lubricant to be discharged into position to lubricate the connection between the cross member and a walking-beam, not shown, which may engage therewith. The base of the shank 2 is provided with screw threads by means of which the cross T can be connected to an adjusting pipe 8, or the like.

In the embodiment shown the cross member is constructed of pipe 3 inches in diameter and substantially 14 inches long with a hole in substantially the middle portion thereof through which 2 inch pipe passes and is welded in position to each side of the cross member. The shank projects away from the cross member for a distance of substantially 3 feet.

By the construction described, a cross T is provided having a cross member relatively large in diameter and which can therefore be used with a minimum of wear upon the walking-beam. The connections of the component parts of the cross T are permanent and will not wear loose during use. The threads for connecting the cross T to the adjusting pipe are disposed in sufficiently spaced relation to the cross member to minimize breaking of the connection. The term "welded" as used in the claims is intended to include brazing or other similar means of integrally connecting metal parts.

Various changes and alternative arrangements may be made within the scope of the claims, in which it is the intention to claim all novelty inherent in the invention as broadly as the prior art permits.

I claim:

1. A cross T, comprising a tubular cross member formed of a single piece of tubing of uniform bore, and a tubular shank of relatively small uniform diameter as compared with the inner diameter of the cross member extending through the member and welded thereto.

2. A cross T, comprising a tubular cross member formed of a single piece of tubing of uniform bore, a tubular shank of relatively small uniform diameter as compared with the inner diameter of the cross member extending through the member and relative thereto, and a ring welded to the end of the shank.

3. A cross T, comprising a tubular cross member formed of a single piece of tubing of uniform bore and having closed ends, a shank of uniform diameter extending through and welded to the member to form a closed connection, a member having openings intermediate its ends, and means for introducing oil into the tubular member.

SILAS E. EVANS.